United States Patent
Bakos

(10) Patent No.: US 10,906,483 B2
(45) Date of Patent: Feb. 2, 2021

(54) REDUCED-COMPLEXITY VEHICLE INSTRUMENT CONTROL UTILIZING BACKCHANNEL TRANSMISSION

(71) Applicants: Robert Bosch LLC, Broadview, IL (US); Robert Bosch GmbH, Stuttgart (DE)

(72) Inventor: Krisztian Bakos, Northville, MI (US)

(73) Assignee: Robert Bosch GmbH, Stuttgart (DE)

( * ) Notice: Subject to any disclaimer, the term of this patent is extended or adjusted under 35 U.S.C. 154(b) by 231 days.

(21) Appl. No.: 16/014,445

(22) Filed: Jun. 21, 2018

(65) Prior Publication Data

US 2019/0389404 A1 Dec. 26, 2019

(51) Int. Cl.
| | |
|---|---|
| *B60R 16/023* | (2006.01) |
| *G06F 3/14* | (2006.01) |
| *H04L 12/801* | (2013.01) |
| *G06F 3/0484* | (2013.01) |
| *G06F 3/0488* | (2013.01) |
| *H04L 12/40* | (2006.01) |

(52) U.S. Cl.
CPC ............ *B60R 16/0231* (2013.01); *G06F 3/14* (2013.01); *H04L 47/12* (2013.01); *G06F 3/0488* (2013.01); *G06F 3/04847* (2013.01); *H04L 2012/40215* (2013.01); *H04L 2012/40273* (2013.01)

(58) Field of Classification Search
CPC .. G05D 1/0816; G05D 1/0858; G05D 1/0011; B64C 15/02; B64C 13/18; B64C 27/20; B64C 27/57; B64C 13/0421; B64C 19/00; B64C 17/00; B64C 29/0091; B64C 2201/146; B60R 16/0231; B60R 16/023; G06F 3/14; G06F 3/04847; G06F 3/0488; H04L 47/12; H04L 2012/40215; H04L 2012/40273; H04L 12/801; B60K 2370/111; B60K 37/06
See application file for complete search history.

(56) References Cited

U.S. PATENT DOCUMENTS

| | | | |
|---|---|---|---|
| 6,005,561 A | 12/1999 | Hawkins et al. | |
| 6,243,427 B1 | 6/2001 | Stockton et al. | |
| 8,233,477 B1 | 7/2012 | Goergen et al. | |
| 9,742,523 B2 | 8/2017 | Cornett et al. | |
| 2002/0095679 A1 | 7/2002 | Bonini | |
| 2017/0078112 A1 | 3/2017 | Troemel, Jr. et al. | |
| 2017/0345300 A1* | 11/2017 | Kawai | G08G 1/096725 |
| 2019/0302761 A1* | 10/2019 | Huang | G05D 1/0016 |

* cited by examiner

*Primary Examiner* — Nga X Nguyen
(74) *Attorney, Agent, or Firm* — David Kovacek; Maginot, Moore & Beck LLP

(57) ABSTRACT

An instrument control system and method for utilizing backchannel bandwidth of a display channel to transmit data and commands to instruments. The system and method may be implemented with respect to a number of instruments disposed within a vehicle. The backchannel bandwidth may be utilized by a number of instruments forming an instrument cluster. The transmission of display data and instrument data may utilize a processor configured to deserialize data provided in a serialized format conforming to known digital protocol.

14 Claims, 2 Drawing Sheets

REDUCED-COMPLEXITY VEHICLE INSTRUMENT CONTROL UTILIZING BACKCHANNEL TRANSMISSION

TECHNICAL FIELD

This disclosure relates to the control of human-machine interfaces, and in particular, a human-machine interface disposed within a console of a vehicle.

BACKGROUND

Instruments in a vehicle provide an interface for a user to control the functions of the vehicle. The instruments may be operated in groups of instrument clusters connected to a central controller bus operable to coordinate the functions of the vehicle. Individual instrument clusters may be controlled by a dedicated controller reserved for each instrument, or instrument cluster. Controllers may comprise a circuit or processor. Instrument clusters may be directed to functions of the vehicle pertaining to driving, but other instrument cluster may be directed to non-driving functions, such heating/cooling, multimedia functions, interior lighting. The control signals transmitted between the instruments and their respective controller may comprise a relatively small bandwidth, and may utilize a bi-directional transmission channel.

SUMMARY

Utilizing a dedicated controller for each instrument or instrument cluster increases the cost and complexity of the vehicle's instrument clusters. Utilizing a single controller for a plurality of instruments or instrument clusters may advantageously reduce the cost and complexity of the vehicle controls. Instruments or instrument clusters may require relatively limited transmission bandwidth. Thus, an existing channel between a controller and a device may exhibit sufficiently high bandwidth to accommodate additional transmissions within a sidechannel or backchannel of the existing channel. Such implementations may advantageously permit control of multiple instruments with a smaller number of controllers, reducing the cost and complexity of the controller system of the vehicle. Some embodiments may advantageously comprise programmable controller processors, which may additionally be modified using software or firmware updates.

One aspect of this disclosure is directed to a data processing system disposed at least in part within a vehicle. The data processing system may comprise a datastore, a processor in data communication with the datastore and a controller bus of the vehicle, a display in data communication with the processor via a display channel having a maximum transmission bandwidth, and a number of instruments in data communication with the processor. The number of instruments may achieve data communication with the processor using the display channel. The display may require bandwidth less than the maximum transmission bandwidth, and the number of instruments may utilize whatever bandwidth remains in the display channel via a backchannel.

Another aspect of this disclosure is directed to a non-transitory machine-readable medium comprising machine-readable data that, when executed by a processor, cause the processor to perform steps including transmitting image data to a display across a data channel having a maximum bandwidth, receiving operational data from an instrument cluster, and transmitting command data to the instrument cluster. The operational data and command data may be utilized to control the functions of the instrument cluster. The operational data and the command data may be transmitted across the data channel utilizing bandwidth that is not required for transmission of the image data.

A further aspect of this disclosure is directed to a method comprising steps including establishing a primary data connection between a data processor and a display using a transmission channel. The transmission channel may additionally accommodate transmission between the data processor and number of instruments, utilizing bandwidth that is not required for the primary data connection.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
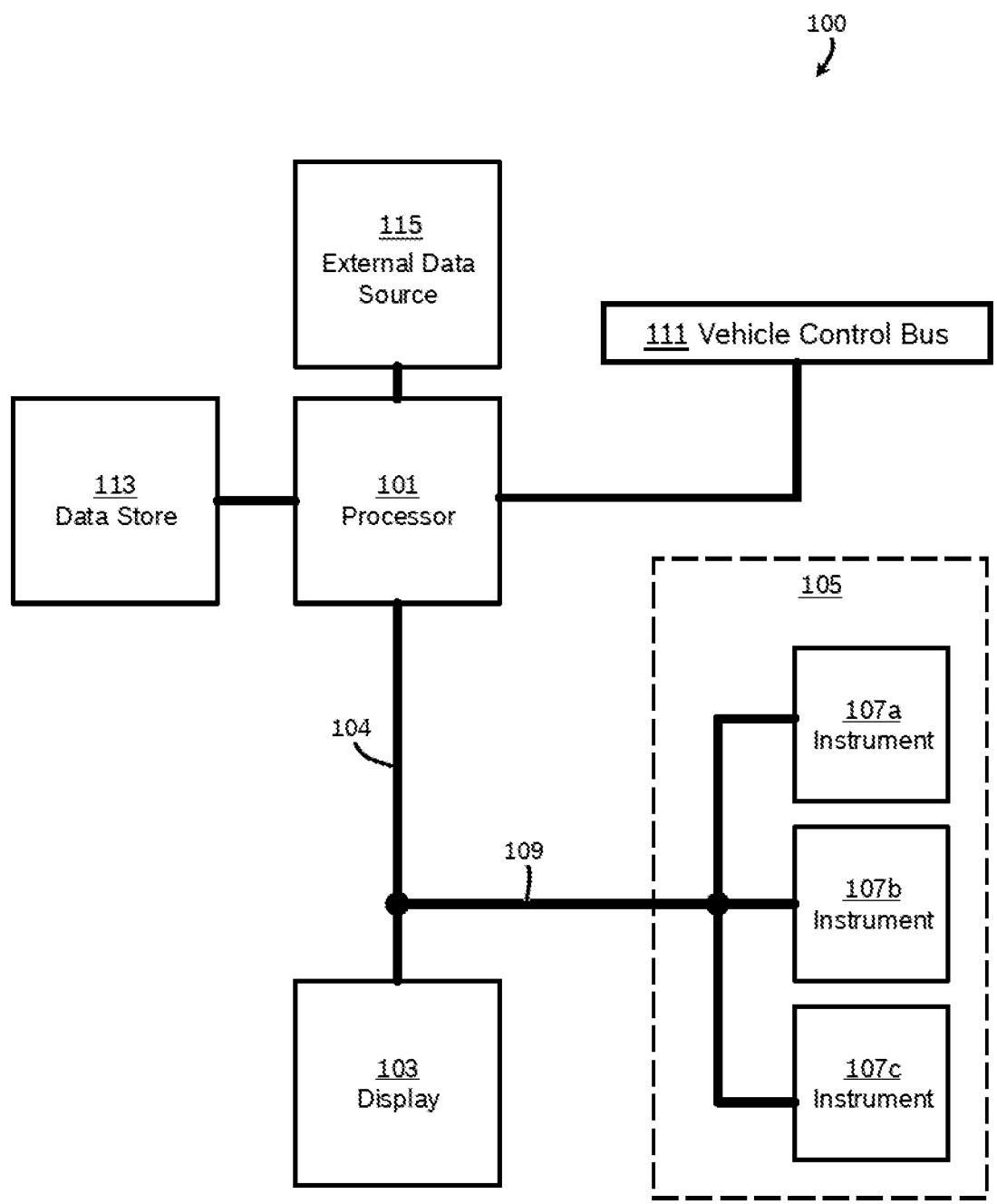
FIG. 1 is a block diagram of a control system utilizing a backchannel of a display transmission channel.

FIG. 1 shows a block diagram of an instrument control system 100 according to an embodiment of the invention disclosed herein. In the depicted embodiment, instrument control system 100 may be associated with the operations of a vehicle, but other embodiments may comprise other configurations without deviating from the teachings disclosed herein. Instrument control system 100 comprises a processor 101 in data communication with a display 103 using a display channel 104. Display channel 104 may comprise a digital transmission channel having a maximum potential bandwidth, but other embodiments may comprise other implementations of display channel 104 without deviating from the teachings disclosed herein. In some embodiments, the maximum potential bandwidth of display channel 104 may be characterized instead as the maximum processing capacity of processor 101 without deviating from the teachings disclosed herein. Display channel 104 may comprise a high-bandwidth transmission protocol, such as FPD-Link, OpenLDI, embedded DisplayPort, a Reduced Swing Differential Signaling (RSDS) protocol, or any other transmission protocol suitable for transmitting display data known to one of ordinary skill in the art without deviating from the teachings disclosed herein. Display 103 may be colored, non-colored (e.g., gray-scale), or a combination of both without deviating from the teachings disclosed herein. The display 103 may be implemented as any type of display including LCD, LED, VGA, OLED, SVGA, CRT, or any other alternative configuration known to one of ordinary skill in the art without deviating from the teachings disclosed herein. The display 103 may provide touch-screen functionality without deviating from the teachings disclosed herein.

Display channel 104 may comprise a sufficiently-high bandwidth that the transmission of data between processor 101 and display 103 is less than the maximum potential bandwidth of display channel 104. In the depicted embodiment, the unused bandwidth of display channel 104 may be utilized for exchanging control data with an instrument cluster 105, comprising a number of instruments 107. Utilization of the unused bandwidth of display channel 104 may form a backchannel 109 between processor 101 and instrument cluster 105. Backchannel 109 may provide bi-directional communication between processor 101 and instrument cluster 105. Communications utilizing backchannel 109 may conform to a digital communication standard. In the depicted embodiment, backchannel 109 may utilize an Inter-Integrated Circuit ($I^2C$) protocol, but other embodiments may utilize other standards without deviating from the teachings disclosed herein. Other embodiments may comprise other backchannels in addition to backchannel 109 without deviating from the teachings disclosed herein. In any embodiment, the collective bandwidth requirements of the backchannels are less than the difference between the maximum potential bandwidth of display channel 104 and the bandwidth utilized by display 103.

Instrument cluster 105 may comprise a number of instruments 107. The combined bandwidth requirements of instruments 107 collectively using backchannel 109 may advantageously be no more than the difference between the maximum potential bandwidth of display channel 104 and the bandwidth required for operation of display 103. In some embodiments, the bandwidth required by display 103 may be a fixed bandwidth with respect to time, which advantageously may leave a consistent amount of bandwidth to be utilized by backchannel 109. In some such embodiments, the data required by display 103 may comprise video data having a fixed bitrate and describing the display of a human-machine interface with a vehicle, such as the menu system of a head unit of the vehicle. In some embodiments, display 103 may comprise a touchscreen display such that display channel 104 may comprise bi-directional communication between processor 101 and display 103, but other embodiments may comprise communication in only one direction without deviating from the teachings disclosed herein. In some such embodiments, the touchscreen components of display 103 may be operable for human interaction with on-screen graphics, such as a menu system of a human-machine interface presented by display 103.

In the depicted embodiment, instrument cluster 105 comprises three instruments 107*a*, 107*b*, and 107*c*, but other embodiments may comprise a different number of instruments without deviating from the teachings disclosed herein. In the depicted embodiment, instrument 107*a* may comprise a general input/output (GPIO) expander, instrument 107*b* may comprise a light-emitting diode (LED) driver, and instrument 107*c* may comprise a stepper motor driver. Other embodiments may comprise different instruments without deviating from the teachings disclosed herein, such as an LED display, a liquid crystal display (LCD), a speedometer, a tachometer, an engine thermometer, a fuel gauge, a chime generator, or any other instrument known to one of ordinary skill in the art. Instruments 107 may comprise components of a human-machine interface, or may comprise other instruments usable for monitoring or controlling functions of the instrument control system 100, the associated vehicle, another device, or any other device known to one of ordinary skill in the art without deviating from the teachings disclosed herein. In any embodiment, the collective bandwidth requirements of instrument 105 utilizing backchannel 109 will be less than the difference between the maximum potential bandwidth of display channel 104 and the bandwidth used by display 103. In the depicted embodiment, display channel 104 and backchannel 109 comprise a single interface with processor 101, but other embodiments may comprise configurations having separate data communication channels for display channel 104 and backchannel 109 without deviating from the teachings disclosed herein.

In some embodiments, instruments 107 may be configured to conform to a particular standard of operation, such protocols of Automotive Safety Integrity Level (ASIL). In the depicted embodiment, instrument 107*b* may comprise an LED driver conforming to ASIL-B compliance requirements, but other embodiments may comprise other configurations without deviating from the teachings disclosed herein. By way of example and not limitation, other configurations of instrument 107 may comprise an LCD image display conforming to ASIL-B compliance, or a chime generator conforming to ASIL-A compliance. Other embodiments may comprise configurations of instruments 107 that conform to other stands, such as standards devised by the International Organization of Standardization (ISO), standards devised by the International Electrotechnical Commission (IEC), or standards determined by local, regional, national, or international laws or regulations without deviating from the teachings disclosed herein. Some of a plurality of instruments 107 may conform one or more standards of operations without deviating from the teachings disclosed herein.

Processor 101 may be configured to efficiently communicate with instruments 107 via backchannel 109. In some embodiments, processor 101 may comprise a deserializer configured to receive data in a particular format and deserialize the data for communication with one of instruments 107, such that particular commands within the data may be delimited by processor 101 and transmitted to an appropriate one of instruments 107. Processor 101 may receive data from a vehicle control bus 111, a data store 113, or an external data source 115 in data communication with processor 101. By way of example and not limitation, processor 101 may receive serialized data from vehicle control bus 111 operable to control one or more of instruments 107. Processor 101 may deserialize the received data and provide the control data to the appropriate one or more of instruments 107 in response.

In the depicted embodiment, vehicle control bus 111 may conform to a particular protocol, such as a Controller Area Network (CAN) standard, or any other protocol known to one of ordinary skill in the art to be sufficient for controlling devices without deviating from the teachings disclosed herein. Processor 101 may comprise a deserializer operable to deserialize the data received from vehicle control bus 111 into a series of commands formatted to conform with an $I^2C$ format for use with instruments 107. Other embodiments may comprise other limitations without deviating from the teachings disclosed herein.

Data store 113 may comprise data useful for the operations of processor 101, display 103, Data store 113 may be embodied as a non-transitory computer-readable storage medium or a machine-readable medium for carrying or having computer-executable instructions or data structures stored thereon. Such non-transitory computer-readable storage media or machine-readable medium may be any available media embodied in a hardware or physical form that can be accessed by a general purpose or special purpose computer. By way of example, and not limitation, such non-transitory computer-readable storage media or machine-readable medium may comprise random-access memory (RAM), read-only memory (ROM), electrically erasable programmable read-only memory (EEPROM), optical disc storage, magnetic disk storage, linear magnetic data storage, magnetic storage devices, flash memory, or any other medium which can be used to carry or store desired program code means in the form of computer-executable instructions or data structures. Combinations of the above should also be included within the scope of the non-transitory computer-readable storage media or machine-readable medium.

In some embodiments, data store 113 may comprise instructions usable by processor 101 for the operation thereof. Data store 113 may comprise graphics data useful for control of display 103, such as graphical components of a human-machine interface, or analytics data describing operation of the vehicle, or other data recognized by one of ordinary skill in the art to be useful for presentation to a user of the vehicle without deviating from the teachings disclosed herein. In the depicted embodiment, additional analytics data may be received by processor 101 from vehicle control bus 111.

In the depicted embodiment, processor 101 is also in data communication with an external data source 115, which may be operable to provide other data useful to the operation of instrument control system 100, display 103, one or more of instruments 107, the associated vehicle, or any other alternative data recognized to be useful by one of ordinary skill in the art without deviating from the teachings disclosed herein. External data source 115 may be in wired or wireless connection with processor 101 without deviating from the teachings disclosed herein. External data source 115 may comprise command data operable with one of processor 101, display 103, one or more of instruments 107, or vehicle control bus 111. In some embodiments, processor 101 may be configured to deserialize data and commands from vehicle control bus 111, data store 113, or external data source 115 for transmission along display channel 104. In some embodiments, processor 101 may be configured to operate as a serializer. In some such embodiments, processor 101 may be configured to serialize data and commands from vehicle control bus 111, data store 113, or external data source 115 for transmission along display channel 104 without deviating from the teachings disclosed herein. In some embodiments, processor 101 may be configured to serialize data and commands from one or more of display 103, instruments 107, vehicle control bus 111, data store 113, or external data source 115 for transmission to one or more of vehicle control bus 111, data store 113, or external data source 115 without deviating from the teachings disclosed herein.

Figure 2:
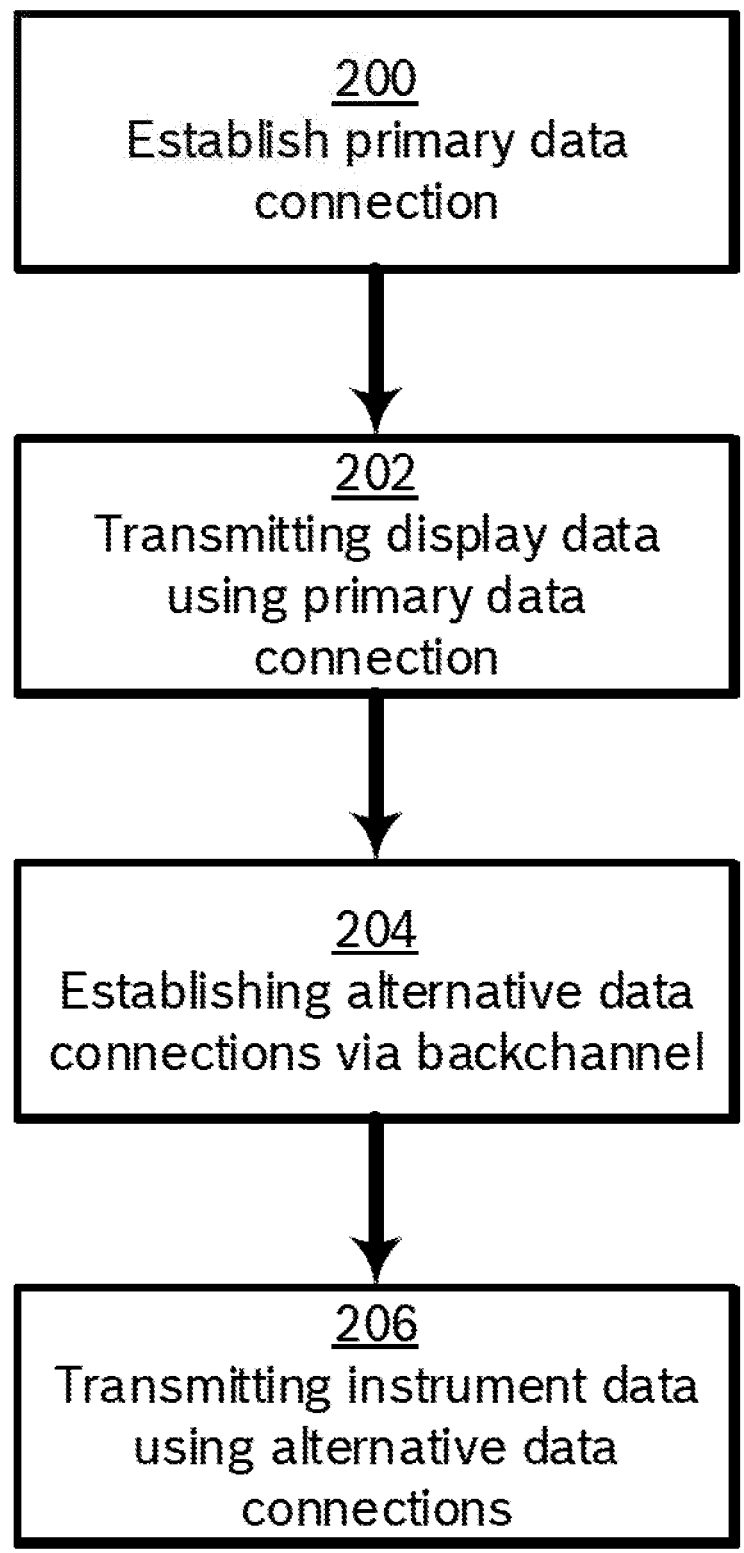
FIG. 2 is a flowchart describing the utilization of a display transmission channel as a backchannel for use in a control system.

FIG. 2 is a flowchart of a method of establishing a control backchannel within a display channel of a vehicular control system according to an embodiment of the teachings disclosed herein. At step 200 a processor establishes a primary data connection to a display. The primary data connection comprises a potential maximum bandwidth.

At step 202, display data is transmitted from the processor to the display utilizing the primary data connection, utilizing a total bandwidth less than the potential maximum bandwidth of the primary data connection.

Proceeding to step 204, the processor establishes alternative data connections between the processor and other instruments of the vehicle other than the display. Instruments may comprise human-machine interface components, or analytic instruments useful in operating the vehicle, such as LED display, an LCD, a speedometer, a tachometer, an engine thermometer, a fuel gauge, a chime generator, a GPIO module, a stepper motor driver, an LED driver, or any other instrument known to one of ordinary skill in the art to be useful for the operation of a vehicle without deviating from the teachings disclosed herein. The total bandwidth requirements of the instruments may be less than the difference between the maximum potential bandwidth of the primary data connection and the bandwidth utilized by the display. The bandwidth of the primary data connection unused by the display may form a backchannel of bandwidth usable for other transmissions. Thus, at step 206, instrument data is transmitted between the processor and instruments utilizing the backchannel bandwidth.

Some embodiments may comprise different numbers of instruments utilizing the backchannel without deviating from the teachings disclosed herein. In some embodiments having a plurality of instruments, data connections with each distinct instrument may be established individually, or the data connection may be established with some or all of the instruments collectively as part of an instrument cluster.

In some embodiments, the establishment of data connections may be completed before the transmission of any data using primary data connection without deviating from the teachings disclosed herein. In some embodiments, the transmission of step 206 may result in the method returning to step 202 to transmit additional display data using the primary data connection. In some embodiments, the method may iteratively cycle through one or more of the steps in order to update the display and continue transmitting instrument data using the backchannel. In some embodiments, the display may be configured to utilize a fixed bandwidth, such as a constant-bitrate transmission of image data. In such embodiments, the fixed bandwidth usage may advantageously provide for a more certain utilization of backchannel bandwidth. In some embodiments, the processor may be configured to received serialized data from an external source and deserialize the data for transmission of commands or other data with the display and the number of instruments.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A instrument control system disposed at least in part within a vehicle comprising:
   a data store;
   a processor in data communication with both the data store and a controller bus of the vehicle;
   a display in data communication with the processor via a display channel having a maximum transmission bandwidth, the display receiving display data from the processor at a first transmission bandwidth less than the maximum transmission bandwidth; and
   a number of instruments in data communication with the processor via a backchannel configured to utilize the unused bandwidth of the display channel, wherein the number of instruments collectively receive data from the processor at a second transmission bandwidth that is not greater than the difference between the maximum transmission bandwidth and the first transmission bandwidth, wherein the required collective bandwidth of the instruments is less than the second transmission bandwidth and the processor is operable to control of each of the number of instruments.

2. The instrument control system of claim 1, wherein the processor comprises a deserializer.

3. The instrument control system of claim 2, wherein the deserializer operation conforms to an Inter-Integrated Circuit ($I^2C$) standard.

4. The instrument control system of claim 2, wherein a controller bus of the vehicle comprises a controller area network (CAN) bus.

5. The instrument control system of claim 1, wherein the display data comprises image data.

6. The instrument control system of claim 5, wherein the display data complies to an OpenLDI standard.

7. An instrument control system disposed at least in part within a vehicle comprising:
   a data store;
   a processor in data communication with both the data store and a controller bus of the vehicle;
   a display in data communication with the processor via a display channel having a maximum transmission bandwidth, the display receiving display data from the processor at a first transmission bandwidth less than the maximum transmission bandwidth; and
   a number of instruments in data communication with the processor, wherein the number of instruments collectively receive data from the processor at a second transmission bandwidth that is not greater than the difference between the maximum transmission bandwidth and the first transmission bandwidth and the processor is operable to control of each of the number of instruments, wherein the display data comprises video data encoded at a fixed bitrate.

8. The instrument control system of claim 7, wherein the display comprises a touchscreen display, and the video data comprises human-machine interface data which the touchscreen display may utilize to provide a human-machine interface.

9. The instrument control system of claim 1, wherein the number of instruments comprises a general-purpose input-output processor operable to control a human-machine interface for a user of the instrument control system.

10. The instrument control system of claim 9, wherein the number of instruments comprises at least two of: a light-emitting diode (LED) display, a liquid crystal display, a speedometer, a tachometer, an engine thermometer, a fuel gauge, or a chime generator.

11. The instrument control system of claim 10, wherein at least one of the number of instruments is a liquid crystal display that complies with an Automotive Safety Integrity Level (ASIL) standard of operation.

12. The instrument control system of claim 10, wherein at least one of the number of instruments is an LED diver that complies with an Automotive Safety Integrity Level-B (ASIL-B) standard of operation.

13. The instrument control system of claim 5, wherein the display data complies to an Embedded DisplayPort (eDP) standard.

14. The instrument control system of claim 5, wherein the display data complies to a Reduced Swing Differential Signaling (RSDS) standard.

* * * * *